US012793025B2

(12) United States Patent
Haight et al.

(10) Patent No.: US 12,793,025 B2
(45) Date of Patent: Nov. 10, 2026

(54) MAINTENANCE SYSTEM AND METHOD

(71) Applicant: THE BOEING COMPANY, Arlington, VA (US)

(72) Inventors: Joshua Sean Haight, Corona, CA (US); Cecille L. Perez-Abobo, Anaheim, CA (US); David Moses Roberts, III, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 22 days.

(21) Appl. No.: 18/959,752

(22) Filed: Nov. 26, 2024

(65) Prior Publication Data

US 2025/0335880 A1 Oct. 30, 2025

Related U.S. Application Data

(60) Provisional application No. 63/640,251, filed on Apr. 30, 2024.

(51) Int. Cl.
*G06Q 10/20* (2023.01)
*G06N 3/04* (2023.01)
*G07C 5/00* (2006.01)

(52) U.S. Cl.
CPC ............... *G06Q 10/20* (2013.01); *G06N 3/04* (2013.01); *G07C 5/006* (2013.01)

(58) Field of Classification Search
CPC .......... G06Q 10/20; G06N 3/04; G07C 5/006; B64U 2101/26; B64F 5/40; B64F 5/60; B64F 5/45; B64F 5/00; B60L 2200/10; B64D 2045/0085; B60W 2050/14
See application file for complete search history.

(56) References Cited

U.S. PATENT DOCUMENTS 10,204,323 B1 * 2/2019 Miller .................... G07C 5/008
10,360,601 B1 * 7/2019 Adegan .............. G06Q 30/0283
11,887,407 B2 * 1/2024 Wojciechowski ..... G06Q 10/20
2004/0034456 A1 * 2/2004 Felke ........................ B64F 5/60 701/32.9
2009/0312897 A1 * 12/2009 Jamrosz ................ G06Q 10/06 701/32.1

(Continued)

FOREIGN PATENT DOCUMENTS

CN 113112160 A * 7/2021 ......... G06Q 50/2057
CN 116011598 A * 4/2023

OTHER PUBLICATIONS

Translation of CN113112160A retrieved from Espacenet on May 8, 2026 (Year: 2026).*

(Continued)

*Primary Examiner* — Fadey S. Jabr
*Assistant Examiner* — Faris Asim Shaikh
(74) *Attorney, Agent, or Firm* — Carroll, Hoette & Butscher, LLC; Christopher R. Carroll

(57) ABSTRACT

A maintenance system and method identify components of a vehicle in need of repair, calculate several category scores representative of one or more of difficulty or time needed to perform several repairs of the components, and aggregate the category scores for each of the components into an impact score. Icons representative of the impact scores for the components are presented with one or more of sizes or shapes indicative of the impact scores.

20 Claims, 11 Drawing Sheets

300

| 302 Primary Driver Type / FDE Fault Code | 304 PTM Impact Description | 306 Component Removal Driver Part Number | 202 FDE Occurrence Rate Score | 204 Sched Int (SI) Occurrence Rate Score |
|---|---|---|---|---|
| Removal | NOZZL, LEAP CMBCR FUEL INJ | multiple | 0 | 0 |
| Removal | BRAKE, MLG HYD ACTUATED | multiple | 0 | 1 |
| 36145241 | BLEED FAMV RVDT L | 63292070-3 | 3 | 1 |
| Removal | BLADE, LEAP LPC 1ST STG (FAN) | multiple | 0 | 1 |

(A)

| 206 Component Removal Driver Score | 208 Repair Difficulty Score | 210 Aircraft Down Time Score | 212 Special Requirements Score | 214 In the Way Removal Score | 216 MEL Score | 218 IMPACT SCORE |
|---|---|---|---|---|---|---|
| 5 | 4 | 4 | 2 | 2 | 4 | 22 |
| 5 | 3 | 2 | 3 | 0 | 4 | 18 |
| 5 | 3 | 2 | 0 | 0 | 4 | 18 |
| 1 | 3 | 4 | 2 | 2 | 4 | 17 |

(56) References Cited

U.S. PATENT DOCUMENTS

| | | | | |
|---|---|---|---|---|
| 2011/0270482 | A1* | 11/2011 | Holzer | G05B 23/0283 700/79 |
| 2016/0052470 | A1* | 2/2016 | Shore | G06Q 50/40 701/29.1 |
| 2017/0004433 | A1* | 1/2017 | Raghavan | G06Q 10/06393 |
| 2017/0308640 | A1* | 10/2017 | Brelje | G06F 30/15 |
| 2018/0005197 | A1* | 1/2018 | Kesler | G07C 5/006 |
| 2018/0096312 | A1* | 4/2018 | Lechtenberg | G06Q 10/20 |
| 2018/0346151 | A1* | 12/2018 | Sturlaugson | G06N 20/20 |
| 2019/0228594 | A1* | 7/2019 | Nakhkoob Niasar | B64D 45/00 |
| 2020/0074758 | A1* | 3/2020 | Boggio | G06F 30/15 |
| 2020/0278273 | A9* | 9/2020 | Shapiro | G06F 11/0754 |
| 2020/0342389 | A1* | 10/2020 | Merg | G06Q 10/063112 |
| 2021/0097489 | A1* | 4/2021 | Gulati | G06Q 10/20 |
| 2021/0132634 | A1* | 5/2021 | Groden | G05D 1/46 |
| 2021/0272393 | A1* | 9/2021 | Ehlert | G07C 5/0808 |
| 2021/0335059 | A1* | 10/2021 | Dixit | G05B 23/0254 |
| 2021/0335060 | A1* | 10/2021 | Bauer | G07C 5/0816 |
| 2022/0026895 | A1* | 1/2022 | Leitch | B64F 5/40 |
| 2022/0350821 | A1* | 11/2022 | Chapman | G06F 16/22 |
| 2023/0083255 | A1* | 3/2023 | Ebrahimi | G07C 5/006 701/31.6 |
| 2023/0401544 | A1* | 12/2023 | Rimell | G06Q 10/04 |
| 2024/0013266 | A1* | 1/2024 | Yoshimi | G06T 7/0004 |
| 2025/0037091 | A1* | 1/2025 | Ishibashi | G06Q 10/20 |
| 2025/0045709 | A1* | 2/2025 | Blankenship | G06Q 10/02 |
| 2025/0256863 | A1* | 8/2025 | Li | B64F 5/40 |
| 2025/0256864 | A1* | 8/2025 | Catledge | G06Q 10/06312 |

OTHER PUBLICATIONS

Translation of CN116011598A retrieved from Espacenet on May 8, 2026 (Year: 2026).*

* cited by examiner

200

| | 202 | 204 | 206 | 208 |
|---|---|---|---|---|
| | FDE Occurrence Rate Score | Sched Int (SI) Occurrence Rate Score | Component Removal Driver Score | Repair Difficulty Score |
| **Explanation Of Factor** | Based on FDE Occurrence Rate More points given to higher rates | Based on Occurrence Rate More points given to higher rates<br><br>Note: Only Technical SIs will be included (Turn backs, cancellations, diversions & Delays > 15 min) | Based on component removal ranking More points given to higher ranking drivers | Based on how difficult it is to perform maintenance More points given to the most difficult tasks |

A

FIG. 2

A

| 210 | 212 | 214 | 216 | 218 |
|---|---|---|---|---|
| Aircraft Down Time Score | Special Requirements Score | In the Way Removal Score | MEL Score | IMPACT SCORE |
| Based on Aircraft Down time (for fault isolation, removal, replace or repair, and test verification (FIM + AMM time)) More points given to the most time consuming tasks | Based on the need for special requirements to perform maintenance More points given to the tasks that require special requirements | Based on accessibility to components More points given to the tasks that require in-the-way removals | Based on the ability to defer maintenance More points given to the tasks that are not deferrable | Sum of all the scores |

FIG. 2
CONTINUED

300

| Primary Driver Type / FDE Fault Code (302) | PTM Impact Description (304) | Component Removal Driver Part Number (306) | FDE Occurrence Rate Score (202) | Sched Int (SI) Occurrence Rate Score (204) |
|---|---|---|---|---|
| Removal | NOZZL, LEAP CMBCR FUEL INJ | multiple | 0 | 0 |
| Removal | BRAKE, MLG HYD ACTUATED | multiple | 0 | 1 |
| 36145241 | BLEED FAMV RVDT L | 63292070-3 | 3 | 1 |
| Removal | BLADE, LEAP LPC 1ST STG (FAN) | multiple | 0 | 1 |

(A)

| Component Removal Driver Score (206) | Repair Difficulty Score (208) | Aircraft Down Time Score (210) | Special Requirements Score (212) | In the Way Removal Score (214) | MEL Score (216) | IMPACT SCORE (218) |
|---|---|---|---|---|---|---|
| 5 | 4 | 4 | 2 | 2 | 4 | 22 |
| 5 | 3 | 2 | 3 | 0 | 4 | 18 |
| 5 | 3 | 2 | 0 | 0 | 4 | 18 |
| 1 | 3 | 4 | 2 | 2 | 4 | 17 |

FIG. 3

MAINTENANCE SYSTEM AND METHOD

CROSS-REFERENCE TO RELATED APPLICATIONS

This application claims priority to U.S. Provisional Application No. 63/640,251 (filed 30 Apr. 2024), the entire contents of which are incorporated herein by reference.

FIELD OF THE DISCLOSURE

Examples of the present disclosure generally relate to work task management systems and methods, such as can be used during maintenance of vehicles.

BACKGROUND OF THE DISCLOSURE

Vehicles, such as commercial aircraft, include numerous systems, devices, components, and the like. Maintenance processes for a commercial aircraft can be complex and time-consuming. During such processes, various work tasks are performed by mechanics.

Various maintenance issues can arise in relation to a commercial aircraft. One or more mechanics are assigned to address the issues. As can be appreciated, certain issues can be more pressing than others.

While maintenance issues lead to downtime for aircraft, aircraft operators typically are not provided information regarding mechanic time to address such issues.

SUMMARY OF THE DISCLOSURE

A need for a system and a method that provides information regarding mechanic time to address issues (e.g., faults) in relation to maintenance of vehicles, such as aircraft.

With that need in mind, certain examples of the present disclosure provide a system including a control unit configured to receive data regarding maintenance issues for a vehicle, analyze the data to determine priority of issues and mechanic time to address the issues, and provide visualization on a display of the issues and the mechanic time to address the issues.

Certain examples of the present disclosure provide a method including receiving, by a control unit, data regarding maintenance faults for a vehicle; analyzing, by the control unit, the data to determine priority of faults and mechanic time to address the faults; and operating, by the control unit, a display to provide a visualization of the faults and the mechanic time to address the faults.

In one example, a method includes identifying components of a vehicle in need of repair; calculating several category scores representative of one or more of difficulty or time needed to perform several repairs of the components; aggregating the category scores for each of the components into an impact score; and presenting icons representative of the impact scores for the components, the icons presented with one or more of sizes or shapes indicative of the impact scores.

In another example, a maintenance system includes a control unit configured to identify components of a vehicle in need of repair, calculate several category scores representative of one or more of difficulty or time needed to perform several repairs of the components, and aggregate the category scores for each of the components into an impact score; and a display device configured to present icons representative of the impact scores for the components, the icons presented with one or more of sizes or shapes indicative of the impact scores.

In another example, a maintenance system includes a control unit configured to identify components of a vehicle in need of repair, calculate several category scores representative of one or more of difficulty or time needed to perform several repairs of the components, and aggregate the category scores for each of the components into an impact score, the category scores including flight deck effect occurrence rate scores indicative of first occurrence rates at which the repairs are needed as the category scores, scheduled interval occurrence rate scores indicative of second occurrence rates at which the components have faults leading to requiring the repairs, component removal scores indicative of difficulties in removing the components in need of the repairs, repair difficulty scores indicative of difficulties involved in performing the repairs, vehicle down time scores indicative of down time durations of the vehicle during the repairs, special requirement scores indicative of specialized needs to complete the repairs, in-the-way removal scores indicative of additional components that are to be removed to complete the repairs, and minimum equipment list scores indicative of abilities to defer the repairs and abilities of the vehicle to fly with the repairs being deferred; and a display device configured to present icons representative of the impact scores for the components, the icons presented with one or more of sizes or shapes indicative of the impact scores.

BRIEF DESCRIPTION OF THE DRAWINGS

FIG. 2 shows charts regarding time considerations during analysis by a control unit of the maintenance system shown in FIG. 1.

FIG. 3 illustrates a table providing one example of the control unit assigning values to scores for different repair or maintenance actions performed on different components.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word “a” or “an” should be understood as not necessarily excluding the plural of the elements or steps. Further, references to “one example” are not intended to be interpreted as excluding the existence of additional examples that also incorporate the recited features. Moreover, unless explicitly stated to the contrary, examples “comprising” or “having” an element or a plurality of elements having a particular condition can include additional elements not having that condition.

Figure 1:
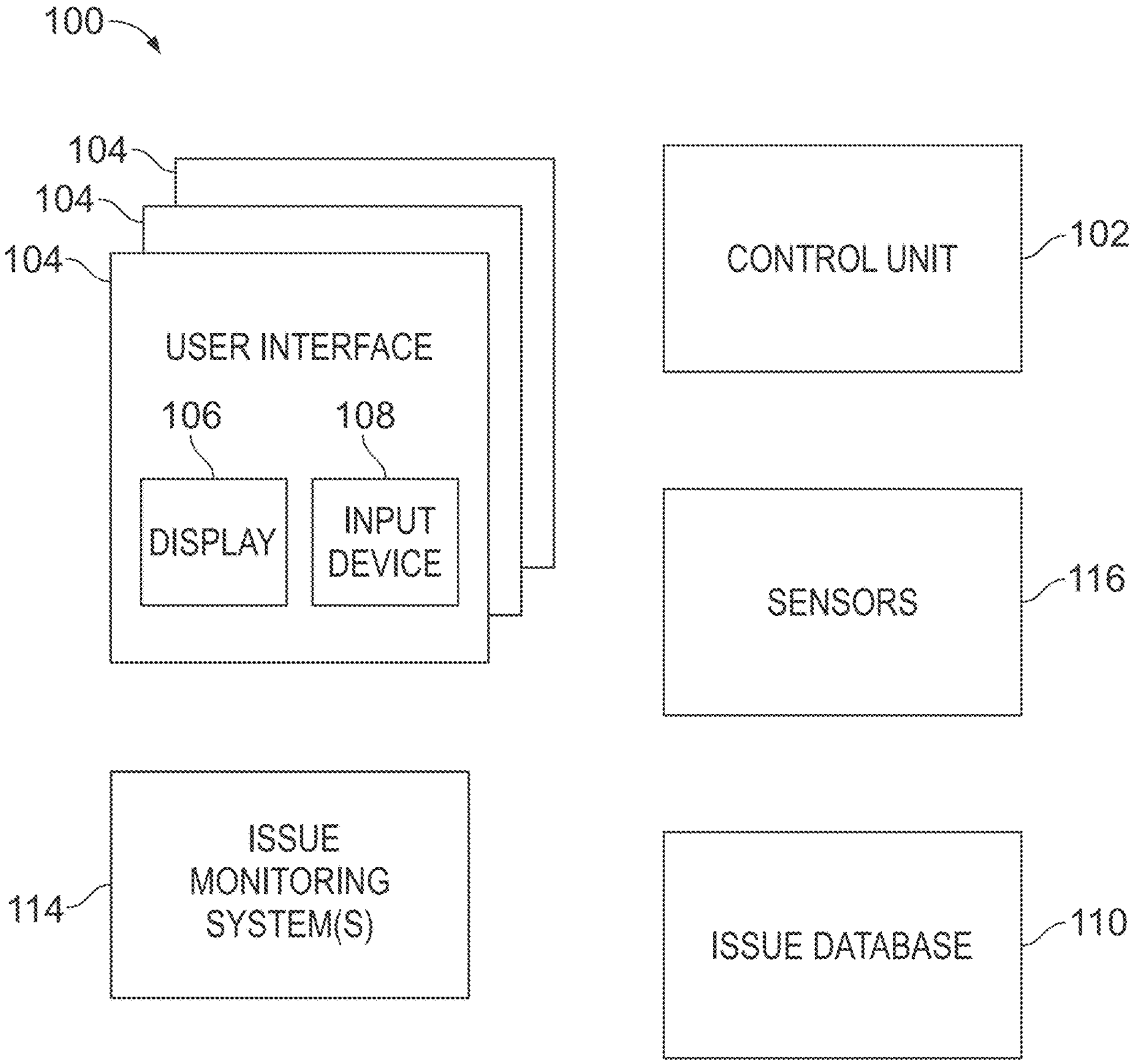
FIG. 1 illustrates a block diagram of one example of a maintenance system.

FIG. 1 illustrates a block diagram of one example of a maintenance system 100, according to an example of the present disclosure. The system 100 includes a control unit 102 in communication with one or more user interfaces 104, such as through one or more wired or wireless connections. The control unit 102 can represent hardware circuitry that includes and/or is connected with one or more processors (e.g., microprocessors, integrated circuits, field programmable gate arrays, microcontrollers, etc.) that perform the operations described herein in connection with the control unit 102. The user interface 104 includes a display 106 in communication with an input device 108. The display 106 can be a monitor, screen, television, touchscreen, and/or the like. The input device 108 can include a keyboard, mouse, stylus, touchscreen interface (that is, the input device 108 can be integral with the display 106), and/or the like. The user interfaces 104 can be computer workstations at the same or different maintenance facilities. As another example, the user interfaces 104 can be within internal cabins, or flight decks or cockpits, of a vehicle such as an aircraft. As another example, the user interfaces 104 can be part of handheld devices (such as smart phones or smart tablets), portable computers, computer workstations, and/or the like. Optionally, the user interfaces 104 can include a combination of two or more of the foregoing examples.

An individual, such as a mechanic, pilot, or other individual, can enter information regarding maintenance faults through the user interfaces 104. These faults can include, but may not be limited to, results of engine inspections, amounts and/or temperatures of lubrication in the engine, duty cycles or remaining useful lives of various parts or components of the vehicle, malfunctions of components, failures of components, abnormal vibrations, abnormal sounds during operation, loss of power, communication faults, mechanical or physical damage to the airframe, or the like. The control unit 102 receives data regarding such information. This information can represent the faults themselves and/or measurements associated with the faults. The control unit 102 can store such information in an issues database 110, which is in communication with the control unit 102 through one or more wired or wireless connections.

In at least one example, the control unit 102 is also in communication with one or more issue monitoring systems 114 of the vehicle, such as through one or more wired or wireless connections. An airplane health monitoring system is an example of an issue monitoring system 114. The airplane health monitoring system collects information regarding detected faults of various systems, components, devices, and the like of the vehicle. The issue monitoring systems 114 monitor various systems, components, devices, and/or the like of the vehicle, and output data regarding detected faults to the control unit 102. The control unit 102 can store such information in the issues database 110.

In at least one example, the control unit 102 is also in communication with one or more sensors 116 of the vehicle, such as through one or more wired or wireless connections. The sensors 116 can also detect various faults with particular systems, components, devices, and/or the like of the vehicle, and output data regarding detected faults to the control unit 102. The control unit 102 can store such information in the issues database 110. These faults can include, for example, failure of components, decreased functionality/output/operation of the components, wear of the components, or the like.

As shown in FIG. 1, the control unit 102 receives data regarding faults that require maintenance. The data is retrieved from various sources, and is aggregated together, such as in the issues database 110. The sources that can provide this data can include, for example, an in-service data system (ISDS) that provides information from operators and/or maintenance personnel of the vehicle, such as maintenance schedules, information on which components were removed from the aircraft to perform maintenance on other components, etc. The sources can include an airplane health management (AHM) system that provides identification and diagnosis of airplane system issues or faults via remote collection, monitoring, and analysis of airplane data to determine statuses of current and future serviceability or performance of aircraft. The AHM can output flight deck effects (FDE), which represent times needed to repair a component. The times from the FDE can be based on the number of maintenance events for an aircraft or components of the aircraft, which can be normalized based on the number of seats onboard the aircraft. The sources can include minimum equipment lists (MEL), which can be associations between the ability to defer maintenance or repair of the components and the ability of an aircraft to fly without the components. For example, the failure of some components may prevent an aircraft from flying due to the components providing some necessary ability for the aircraft to fly, the failure of other components may prevent the aircraft from flying safely (e.g., some sensors are required for safe flights), etc. These failures can have greater impacts on downtime of aircraft. The failure of other components may not prevent the aircraft from flying, and therefore have smaller impacts on downtime of aircraft.

The control unit 102 analyzes the aggregated data, and determines time impacts for aircraft operations. The time impacts include downtime for the aircraft (such as time that the aircraft is not in service), as well as time for mechanics to address and fix any faults. The downtimes for different faults can include the length of time that an aircraft may not be usable (e.g., is not able to fly) while the fault(s) related to the aircraft are repaired or otherwise corrected. The time for mechanics to address and fix faults can be referred to as repair time, and this time can represent the length of time that a component having or associated with the fault(s) is unable to be used before the fault(s) are remediated, solved, or removed (and the component is able to be used again). In one example, the control unit 102 may associate different downtimes and/or different repair times for different faults. A failed first component may be associated with a first length of downtime and/or a first length of a repair time; a different, second component that has failed may be associated with ah different, second length of downtime and/or repair time; and so on. Additionally, different faults with the same component may be associated with different downtimes and/or repair times. The downtimes and/or repair times may be default values, may be manually input by maintenance personnel, and/or may be learned and/or updated over time (based on actual repairs of other components). The downtimes and/or repair times may be accessed by the control unit 102 in one or more tangible and non-transitory computer-readable storage media, such as the issues database 110.

In at least one example, the control unit 102 analyzes delays, removals, troubleshooting and repair times, minimum equipment list (MEL) relief, repairs, access requirements, tooling constraints, and the like to provide a holistic view of operational impacts posed by maintenance faults. In operation, the control unit 102 receives data regarding various faults for an aircraft and/or components of the aircraft. The data can be stored in the issues database 110. The control unit 102 analyzes the data to identify faults, schedule interruptions, and components that require direct action from airline fleet mechanics. The control unit 102 then measures impacts of issues/faults on mechanic time using one or more factors. The control unit 102 further identifies which airplane faults have the greatest impact on mechanic time. The control unit 102 can then operate a display 106 of a user interface 104 to show which faults create the most difficulty for the mechanics. The control unit 102 can further show, on the display, information to guide investigation of the faults to identify solutions to minimize impacts on mechanics. In at least one example, the control unit 102 can also calculate actual minutes savings achieved and forecast expected minutes saved for proposed solutions, and measure effectiveness of solution after fleet implementation.

The systems and methods described herein provide visualization of issues (such as faults, non-conformances, and the like) impacting mechanic time. The systems and methods include the control unit 102, which is configured to provide visual indicators regarding a degree of difficulty the faults are causing.

As used herein, the term “control unit,” “central processing unit,” “CPU,” “computer,” or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 102 may be or include one or more processors that are configured to control operation, as described herein.

The control unit 102 is configured to execute a set of instructions that are stored in one or more data storage units or elements (such as one or more memories), in order to process data. For example, the control unit 102 may include or be coupled to one or more memories. The data storage units may also store data or other information as desired or needed. The data storage units may be in the form of an information source or a physical memory element within a processing machine.

The set of instructions may include various commands that instruct the control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms “software” and “firmware” can be interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, certain portions of the methods described herein can be performed manually. In at least one example, all or part of the systems and methods described herein may be or otherwise include an artificial intelligence (AI) or machine-learning system that can automatically perform the operations of the methods also described herein. For example, the control unit 102 can be an artificial intelligence or machine learning system.

Examples of the subject disclosure provide systems and methods that allow large amounts of data to be quickly and efficiently analyzed by a computing device. For example, the control unit 102 can analyze various aspects of maintenance operations for large vehicle systems, which include numerous sub-systems, components, parts, and the like. Further, the control unit 102 accounts for variables based on the various aspects, and predicts labor times from the variables, which can be in a format not readily discernable by a human being. As such, large amounts of data, which may not be discernable by human beings, are being tracked and analyzed. The vast amounts of data are efficiently organized and/or analyzed by the control unit 102, as described herein. The control unit 102 analyzes the data in a relatively short time in order to quickly and efficiently determine maintenance faults and labor times to resolve such faults. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one example, components of the systems and methods, such as the control unit 102, provide and/or enable a computer system to operate as a special computer system for determining maintenance faults, predicting mechanic labor time for addressing such faults, and providing visualization of such faults.

FIG. 2 shows charts regarding time considerations during analysis by the control unit 102. Various factors such as flight deck effects occurrence, scheduled interruptions, removal driver, repair difficulty, aircraft downtime, special requirements, in the way removal, and MEL are aggregated by the control unit 102, and analyzed to determine an impact score for a particular faults. Information regarding such factors and lists can be input by mechanics, detected by sensors or monitoring systems, and/or the like.

The time considerations shown in FIG. 2 can represent different category scores 202, 204, 206, 208, 210, 212, 214, 216 indicative of values assigned to repair of a fault by the control unit 102. These category scores 202, 204, 206, 208, 210, 212, 214, 216 are aggregated by the control unit 102 to form the value of an impact score 218. In one example, the category scores 202, 204, 206, 208, 210, 212, 214, 216 can be aggregated by adding the category scores 202, 204, 206, 208, 210, 212, 214, 216 with the impact score 218 being the summed total of the category scores 202, 204, 206, 208, 210, 212, 214, 216. Optionally, one or more weights can be applied to one or more of the category scores 202, 204, 206, 208, 210, 212, 214, 216 to cause the one or more category scores 202, 204, 206, 208, 210, 212, 214, 216 from having a greater impact (with increased weight) or lesser impact (with decreased weight) on the impact score 218. The category scores 202, 204, 206, 208, 210, 212, 214, 216 can be obtained by the control unit 102 from the issues database 110. As described herein, the control unit 102 may modify or update the values and/or weights of the category scores 202, 204, 206, 208, 210, 212, 214, 216.

The control unit 102 can assign the value of the category score 202 as an FDE occurrence rate score. This value can be based on how often (e.g., an occurrence rate) a component has a fault or requires repair or replacement based on the FDE. The control unit 102 can assign greater values to the FDE occurrence rate score 202 for components that fail more often, that require removal of the component more often, and/or that result in flight cancellation more often (compared with components that fail less often, that require removal less often, and/or that result in fewer flight cancellations). The value for the FDE occurrence rate score 202 can be normalized by the control unit 102 based on the number of seats on the aircraft having the failed component. For example, first and second aircraft may have the same number of failures of the same component. If the first aircraft has fewer seats than the second aircraft, then the FDE occurrence rate score 202 for the second aircraft may be assigned a greater value by the control unit 102 than the first aircraft.

The control unit 102 can assign the value of the category score 204 as a scheduled interval (SI) occurrence rate score. This value can be based on how often (e.g., an occurrence rate) a component has a fault or requires repair or replacement. A component having a fault more often may be assigned a greater SI occurrence rate score 204 than other components having the fault less often. In one example, the control unit 102 may only consider component faults having a significant impact on aircraft operation when assigning the SI occurrence rate score 204. For example, the control unit 102 may include the component faults resulting in a turnback of the aircraft, a flight cancellation, a flight diversion, and/or a departure delay of more than a threshold period of time. An aircraft turnback may include an aircraft returning to land after departure when not originally planned or scheduled to do so. A flight diversion can include the flight plan of an aircraft being changed after departure so that the aircraft is directed to a destination that differs from the originally planned or schedule destination. The threshold period of time for the departure delay can be fifteen minutes or another period of time. The control unit 102 may include the components resulting in such impacts in calculating the SI occurrence rate score 204, but not include the components that do not result in such impacts when calculating the score 204.

The control unit 102 can assign the value of the category score 206 as a component removal driver score. This value can be based on how difficult removal of a component involved in the repair or maintenance of the identified fault is. For example, components that are more difficult to reach, that require longer to remove than other components, which require longer to remove, etc., may be assigned higher values as the score 206 by the control unit 102. The control unit 102 may assign greater values to the score 206 for these components than components that are easier to reach, that require less time to remove, that take less time to remove, etc.

The control unit 102 can assign the value of the category score 208 as a repair difficulty score. This value can be based on how difficult repair or maintenance of a component is. For example, components that take longer to repair, that require more parts or consumables to repair, etc., may be assigned higher values by the control unit 102. The control unit 102 can assign lesser values to this score 208 for components that take less time to repair, that require fewer parts or consumables to repair, etc.

The control unit 102 can assign the value of the category score 210 as an aircraft down time score. This value can be based on how long an aircraft will be down and unavailable for flight during repair or maintenance of a faulty component. The control unit 102 can assign greater values to this score 210 for components that require the aircraft to be down and unavailable for flight due to isolation of the faulty component, removal or repair of the component, performance of tests to verify the component repair, etc. The control unit 102 can assign lesser values to this score 210 for components that either do not require the aircraft to be down and unavailable for flight, or that require the aircraft to be down and unavailable for a shorter period of time.

The control unit 102 can assign the value of the category score 212 as a special requirements score. This value can be based on whether a component requires any specialized items or expertise to repair or maintain. For example, some components may require increased experience from maintenance personnel to repair and/or may require specialized tools to repair. The control unit 102 may assign greater values to the special requirements score 212 than other components that require less experience to repair and/or that do not require specialized tools to repair. A tool may be specialized when the tool is designed for repair or part of a repair of a particular components, and is not designed for repair or part of repair of other components.

The control unit 102 can assign the value of the category score 214 as an "in the way" removal score or a removal difficulty score. This value can be based on how many other components need to be removed before the faulty component can be accessed for repair or maintenance. For example, the control unit 102 may assign a greater value to the score 214 for components that require removal of more components to reach the faulty component than components that don't require removal of other components to reach (or require removal of fewer other components to reach).

The control unit 102 can assign the value of the category score 216 as a MEL score or a deference ability score. This value can be based on whether the aircraft containing the faulty component can continue to operate (e.g., fly) until the repair is performed, or whether the aircraft cannot continue to operate while the component is faulty. Some components (e.g., engines, independent drive generators, wheel sets, etc.) are required for the aircraft to continue operating, while other components (e.g., lights so long as the aircraft flies during the day, radio selector knobs, etc.) may not prevent continued operation of the aircraft. The control unit 102 can assign higher values for the MEL score 216 for those components on the MEL (e.g., components that prevent continued operation of the aircraft), lesser values for those components that are not on the MEL but that partially restrict operation of the aircraft (e.g., the aircraft can only operate during daylight), and even smaller values (or a value of zero) for components that are not on the MEL and/or that do not restrict when or where the aircraft can fly.

The control unit 102 can aggregate the scores 202, 204, 206, 208, 210, 212, 214, 216 into the impact score 218 by summing the scores 202, 204, 206, 208, 210, 212, 214, 216. Alternatively, the control unit 102 can aggregate the scores 202, 204, 206, 208, 210, 212, 214, 216 by averaging the scores 202, 204, 206, 208, 210, 212, 214, 216 for the impact score 218, by calculating the median of the scores 202, 204, 206, 208, 210, 212, 214, 216 as the impact score 218, or the like.

FIG. 3 illustrates a table 300 providing one example of the control unit 102 assigning values to the scores 202, 204, 206, 208, 210, 212, 214, 216 for different repair or maintenance actions performed on different components. The table 300 includes four rows each indicating a different component (listed in column 304), as well as the part number or numbers (listed in column 306), and the repair/maintenance being performed (e.g., removal) or the fault code indicating the repair/maintenance to be performed (listed in column 302).

As shown, the control unit 102 assigns different values for the different scores 202, 204, 206, 208, 210, 212, 214, 216 for the different components. In the illustrated example, the component associated with the scores 202, 204, 206, 208, 210, 212, 214, 216 in the top row has the greatest aggregated impact score 218, the components listed in the second and third rows have smaller aggregated impact scores 218, and the component listed in the fourth row has the smallest aggregated impact score 218 (of the four listed components). Therefore, the control unit 102 may identify the component in the first row as having the greatest impact on continued operation of the aircraft, while the component in the fourth row has the smallest impact of continued operation of the aircraft. The impact of a repair may be greater when this repair results in the aircraft being down and unable to fly for longer, requires more expertise and/or specialized tools, requires longer to perform, etc., when compared with lesser impacts.

In one example, each component may be assigned only a single impact score 218. The single impact score 218 can represent the repair or maintenance of all faults of the component. For example, if a component requires the repair or maintenance of two or more different faults, the impact scores 218 for the two or more different faults can be summed to calculate the single impact score 218 for the component. Alternatively, the impact scores 218 can be averaged or a median of the multiple impact scores 218 for the component can be used as the single impact score 218 for the component. In another example, a component may be assigned multiple impact scores 218. If the component requires the repair or maintenance for two or more different faults, the component may be assigned two or more different impact scores 218. Each impact score 218 may represent the repair or maintenance of a different fault of the component.

Figure 4:
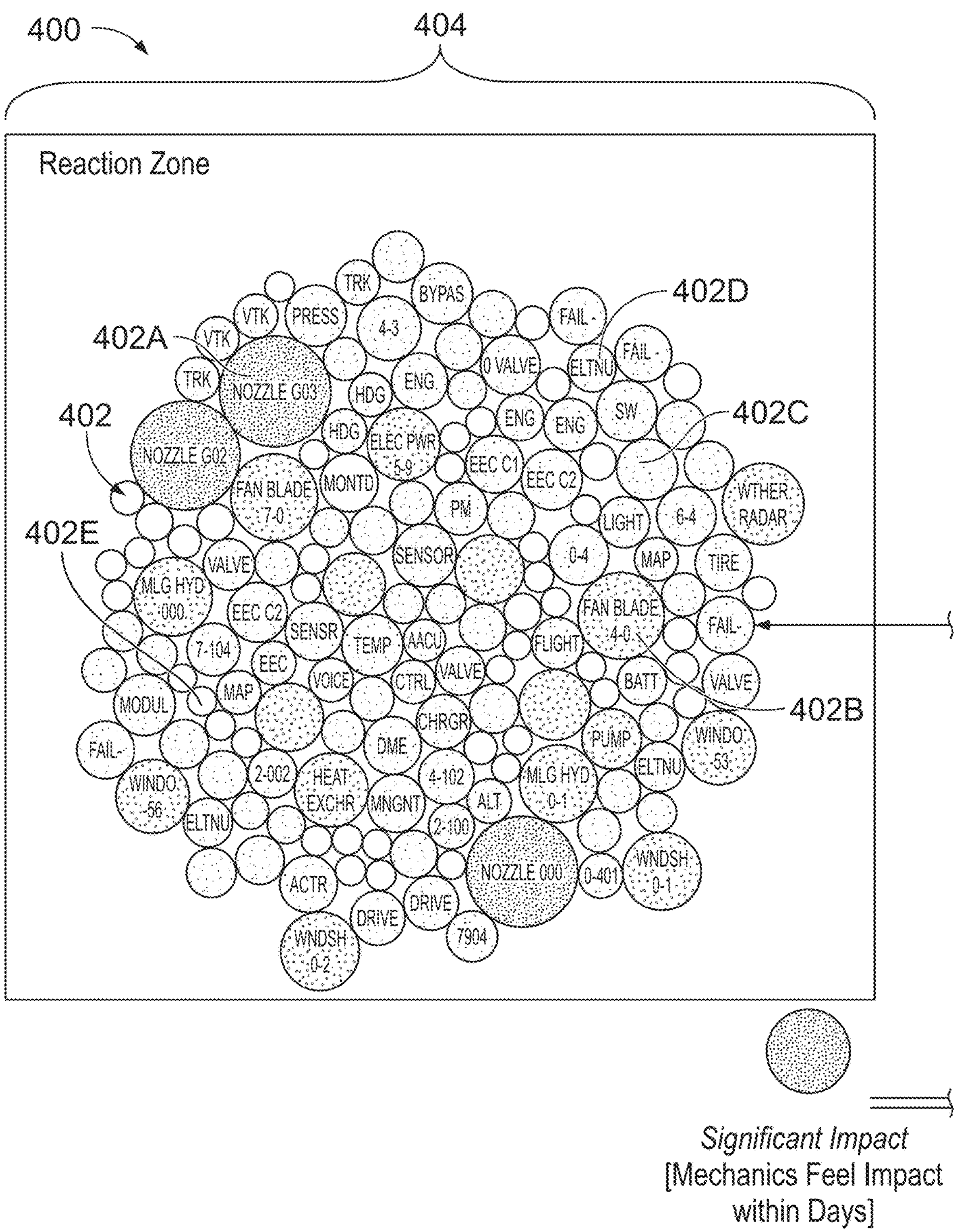
FIG. 4 illustrates one example of a graphical user interface visually presented on a display of the maintenance system shown in FIG. 1.
Figure 4:
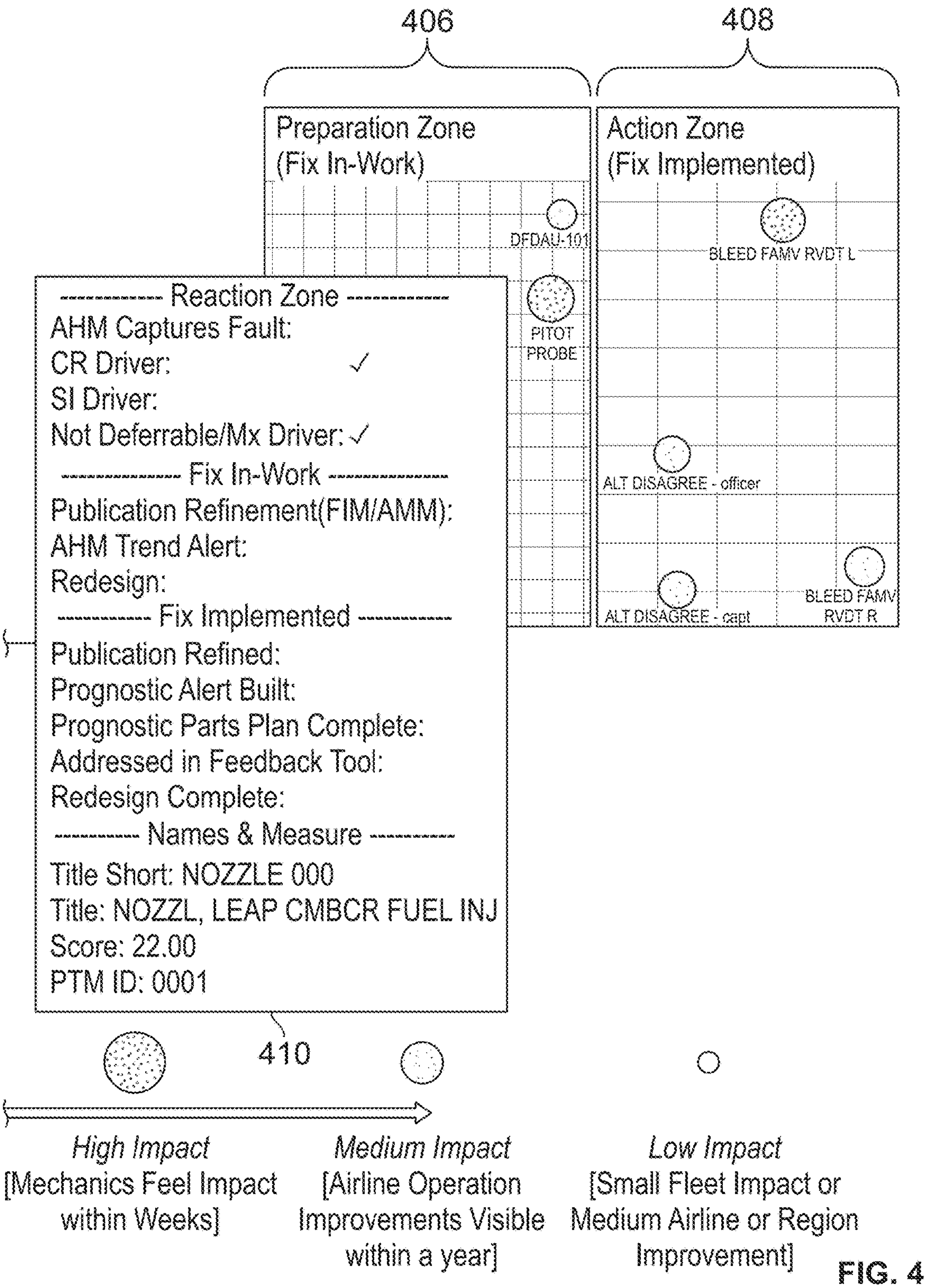

FIG. 4 illustrates one example of a graphical user interface 400 visually presented on the display 106. The control unit 102 can direct the display 106 to present the graphical user interface 400 to represent the different components requiring repair or maintenance, the impact of the repair or maintenance on continued operation of the aircraft, and the status of the repair or maintenance of the different components. The control unit 102 can direct the display 106 to present impact icons 402 such as bubbles, circles, etc. in different sizes, colors, and/or shapes to indicate the impact scores 218 associated with the repair or maintenance of each component. The control unit 102 can direct the display 106 to show these impact icons 402 in different zones or areas 404, 406, 408.

With respect to the impact icons 402, the control unit 102 can direct the display 106 to show a different icon 402 for the repair or maintenance of different components. In one example, each icon 402 represents a single component having one or more repairs or maintenance actions to be performed. Alternatively, each icon 402 can represent a different repair or maintenance action to be performed, and multiple icons 402 can represent multiple repairs or maintenance actions to be performed on the same component.

The control unit 102 can direct the display 106 to show the icons 402 in different sizes to indicate the impact scores 218 associated with the icons 402 (e.g., with the components or repairs). For example, the size of the icon 402 can represent the value of the impact scores 218 represented by the icons 402. Larger icons 402 (e.g., icons 402A) can indicate larger impact scores 218, smaller icons 402 (e.g., icons 402B) can represent smaller impact scores 218, even smaller icons 402 (e.g., icons 402C) can represent smaller impact scores 218, even smaller icons 402 (e.g., icons 402D) can represent smaller impact scores 218, even smaller icons 402 (e.g., icons 402E) can represent smaller impact scores 218, and so on.

Additionally or alternatively, the control unit 102 can direct the display 106 to show the icons 402 in different colors to indicate the impact scores 218 associated with the icons 402. For example, icons 402 associated with larger impact scores 218 can be shown in red (e.g., icons 402A), icons 402 associated with smaller impact scores 218 can be shown in orange (e.g., icons 402B), icons 402 associated with even smaller impact scores 218 can be shown in yellow-orange (e.g., icons 402C), icons 402 with even smaller impact scores 218 can be shown in yellow (e.g., icons 402D), icons 402 with even smaller impact scores 218 can be shown in green (e.g., icons 402E), and so on.

Current systems and methods present a technological problem of being unable to quickly and intelligently inform maintenance personnel of the repairs having the most significant impact on making an aircraft ready to fly. As a result, significant time and resources may be wasted due to an inefficient selection of the repairs to perform on the components. The maintenance system 100 provides a technological solution by calculating the impacts of the different repairs (e.g., the impact scores 218) and visually presenting these impact scores 218 in a way that quickly and intelligently inform the maintenance personnel of the repairs having the greatest impact on making the aircraft ready to fly. For example, maintenance personnel can easily see which repairs have the biggest impact and perform those repairs first (or before repairs having smaller impacts). In one example, the maintenance personnel can use the input device 108 to select or hover a pointer over an icon 402, and the control unit 102 causes additional details of the information associated with the icon 402 (e.g., the component, the fault, the repair or maintenance action(s), the impact score, etc.) to be displayed on the display device 106 (e.g., in a box 410 near the selected icon 402).

The control unit 102 also can direct the display device 102 to arrange the icons 402 in the different zones 404, 406, 408 to represent the status or state of the repair or maintenance represented by the icons 402 in the different zones 404, 406, 408. For example, the icons 402 shown in the zone 404 can represent repairs that have not yet begun or been initiated, the icons 402 shown in the zone 406 can represent repairs that are in progress, and the icons 402 shown in the zone 408 can represent repairs that have been completed. Current systems and methods present another technological problem of being unable to quickly and intelligently inform maintenance personnel of the status of repairs having more significant impact on making an aircraft ready to fly. As a result, significant time and resources may be wasted due to the repairs being performed in an inefficient order. The maintenance system 100 provides a technological solution by calculating the impacts of the different repairs (e.g., the impact scores 218) and visually presenting these impact scores 218 and the status of the associated repairs in a way that quickly and intelligently inform the maintenance personnel of the repairs having the greatest impact on making the aircraft ready to fly. For example, maintenance personnel can easily see which repairs have the biggest impact and which repairs are closer to being completed, and perform or finish those repairs first (or before repairs having smaller impacts).

The control unit 102 generates the graphical user interface on the display 106 to summarize large amounts of information to a user. For example, the graphical user interface with the icons 402 can summarize the many factors influencing the impact scores 218 of many repairs that need to be performed on many different components to efficiently perform repairs on aircraft. This can allow users to see and easily understand a large amount of information on a single screen of the display device 106 that otherwise could not be presented on the single screen. For example, presentation of the information giving rise to the different scores 202, 204, 206, 208, 210, 212, 214, 216 for many components in need of repair requires more space than what is available on a screen of the display device 106. This can require users to scroll around, and switch views many times across many different screens or tabs of the screens to view all the information. Moreover, presentation of this large volume of information would be too much for many aircraft for a user to comprehend in an efficient manner or order to perform the repairs to reduce the downtime for aircraft. Because screens of display devices 106 tend to need large amounts of data or information divided into many layers or views, many known user interfaces require users to drill down through many layers to get to the desired data or information. Such a process is slow, complex, and difficult to learn. In contrast, the inventive subject matter described herein improves efficiency of comprehending the large amount of information shown by the maintenance system 100 by visually summarizing the different impacts of repairing different components on the downtime of an aircraft.

Figure 5:
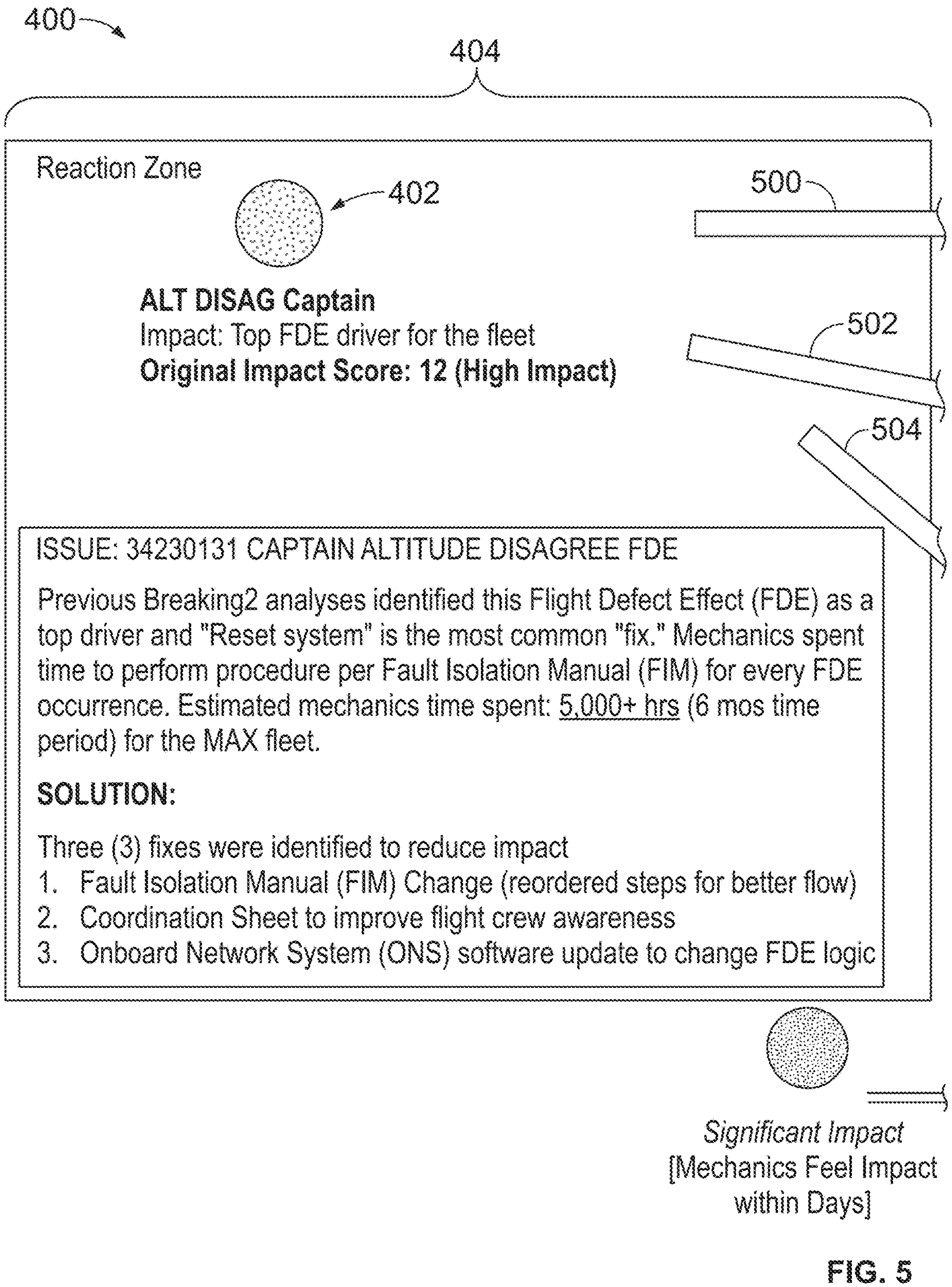
FIG. 5 illustrates one example of the control unit recommending, selecting, and/or implementing a repair action from among several different repair actions.
Figure 5:
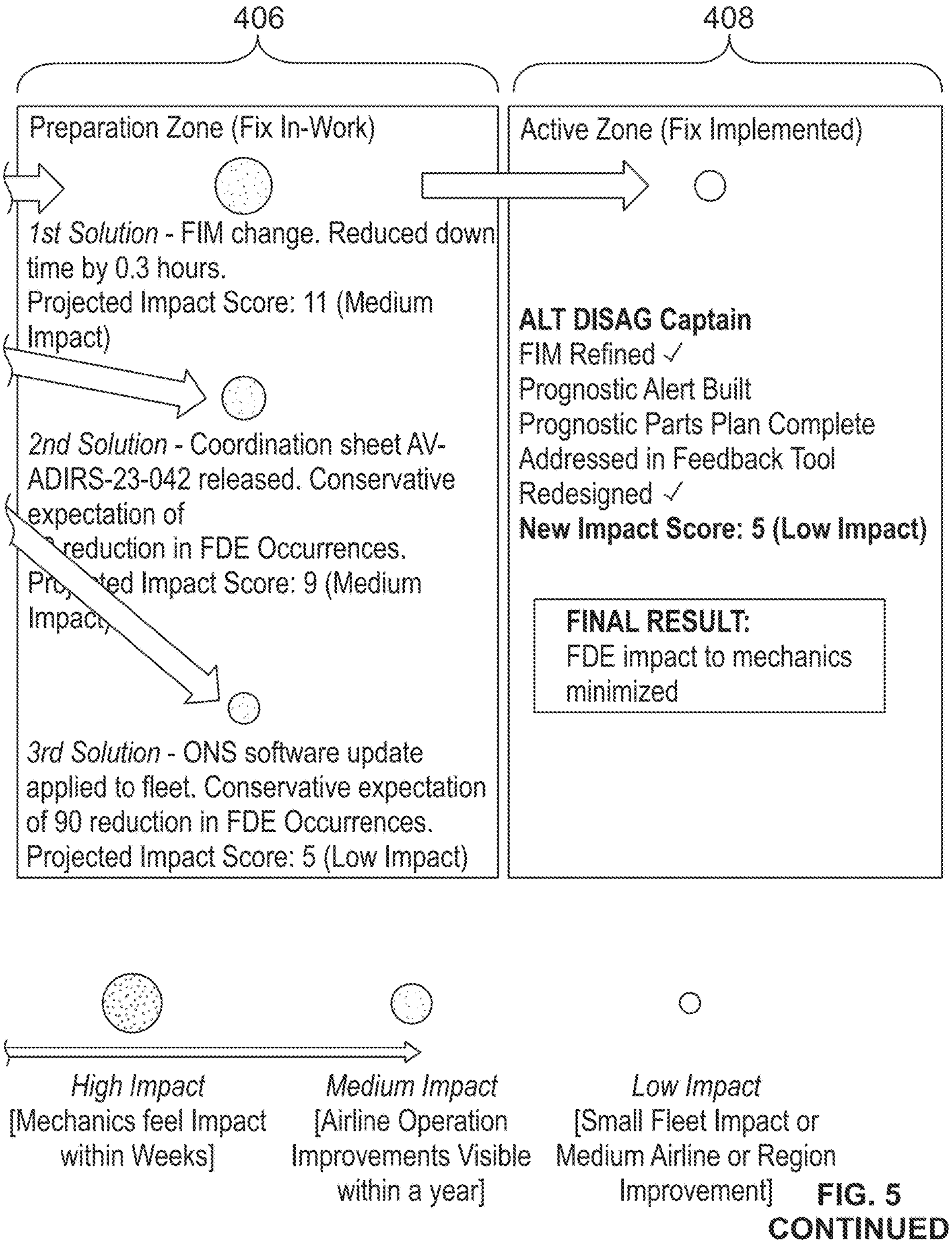

The control unit 102 optionally can recommend, select, and/or implement a repair or maintenance action to perform for one or more of the components. FIG. 5 illustrates one example of the control unit 102 recommending, selecting, and/or implementing a repair action from among several different repair actions. The control unit 102 can calculate the impact scores 218 for different components, as described above. There may be several different repair options 500, 502, 504 for repairing the component. These repair options 500, 502, 504 may be stored in the issues database 110 along with the repair action needed to repair the component. The control unit 102 can calculate the impact score 218 for the component for each of the different repair options 500, 502, 504 that may be performed. For example, the control unit 102 can predict or project a first impact score 218 if the first repair option 500 is performed, a second impact score 218 if the second repair action 502 were to be performed, a third impact score 218 if the third repair action 504 were to be performed.

The control unit 102 can then recommend, select, or implement the repair option 504 that reduces the impact score 218 more than the other repair options 500, 502. The control unit 102 can direct the display device 106 to present information indicating the recommended repair option 504 to the maintenance personnel using the system 100. Optionally, the control unit 102 can implement the repair option 504 that reduces the impact score 218 more than the other repair options 500, 502. This implementation can involve ordering parts or consumables for performing the repair option 504, scheduling performance of the repair option 504, not scheduling other repairs (to ensure maintenance personnel availability and space for performing the selected repair option 504), and the like.

Figure 6:
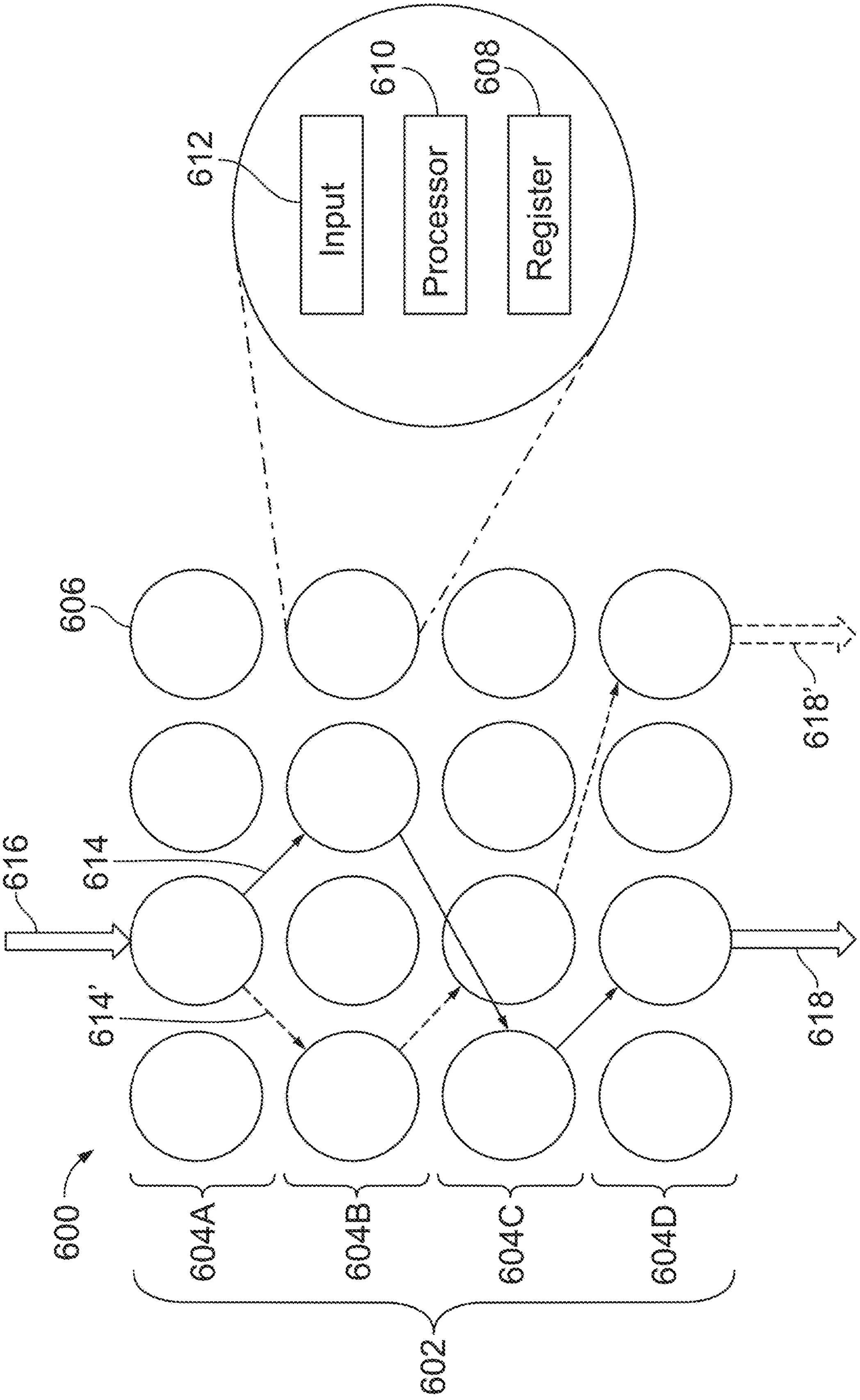
FIG. 6 illustrates one example of an artificial neural network (ANN).

FIG. 6 illustrates one example of an ANN 600. The control unit 102 described herein may be embodied in or may include the ANN 600 to perform the operations described herein. The ANN 600 includes a series 602 of layers 604A-D. Each layer 604A-D includes one or more artificial neurons 606 arranged in one or more neuron arrays or arrangements. While four neurons 606 are shown in each layer 604A-D and four layers 604A-D are shown, alternatively, a different number of neurons 606 may be in one or more of the layers 604A-D and/or there may be a different number of layers 604A-D.

The ANN 600 may include the neurons 606 arranged in an input layer 604A, an output layer 604D, and two or more fully connected hidden or intermediate layers 604B, 604C between the input and output layers 604A, 604D. Each neuron 606 can include or represent a register 608, a microprocessor 610, and at least one input 612. The neurons 606 generate outputs based on one or more activation functions. The neurons 606 receive input from another neuron 606 (e.g., the output from one neuron 606 is the input for another neuron 606). This input also can include a set of weights. The neurons 606 can be connected with each other via synaptic circuits 614, 614'. The synaptic circuits 614, 614' can include or represent memories for storing synaptic weights.

One or more neurons 606 in the input layer 604A of the ANN 600 can receive an input 616 into the ANN 600. This input 616 can identify a repair or maintenance needed for one or more components. These neurons 606 can receive this input 616 via the input(s) 612 of those neurons 606 in the input layer 604A. The neurons 606 receive the input 616, apply one or more mathematical equations or relationships stored in the registers 608 (and that include weights) to generate an output. The processors 610 of the neurons 606 apply the equations/relationships. The processors 610 of the neurons 606 pass that output to another neuron 606 in the same layer 604A or in a different layer 604B, 604C. The output from one neuron 606 is passed along a synaptic circuit 614 to another neuron 606 and is used as input to this other neuron 606. This process continues until one or more neurons 606 in the output layer 604D generate an output 618 from the ANN 600. This output 618 can include, for example, the impact score 218 for the repair or maintenance identified by the input 616. The different neurons 606 can calculate different factors (e.g., scores 202, 204, 206, 208, 210, 212, 214, 216) that form the impact score 218.

The ANN 600 can be realized through software, hardware, or a combination of software and hardware. In some examples, the ANN 600 may be implemented by one or more application-specific integrated circuits (ASICs). ASICs may be specially customized for a specific artificial intelligence application and provide superior computing capabilities and reduced electricity consumption compared to traditional computers.

During training of the ANN 600, labeled training data may be provided as the input 616 to the ANN 600. The neurons 606 process the input 616 to generate the output 618 of the ANN 600. The output 618 from the ANN 600 can be examined to determine whether the impact score 218 that is provided as the output 618 is accurate or inaccurate. For example, the ANN 600 can be provided with different faults of different components as input 616, where the faults were previously repaired and the relative impacts (e.g., time and/or difficulty involved in completing the repairs) were measured or recorded. If the impact scores 218 that are output 618 are different from the measured or recorded impact scores 218, then an error may be calculated (such as the difference in impact scores 218).

Feedback can be provided to the ANN 600 in the form of this calculated error or other indication of the inaccuracy of the impact score 218 that is output 618 from the ANN 600. Based on this error, the neurons 606 can change one or more of the synaptic circuits 614 that connect the neurons 606 and/or the weights applied by one or more of the neurons 606. These weights can change one or more of the scores 202, 204, 206, 208, 210, 212, 214, 216, such as by changing one or more of the weights applied to the scores 202, 204, 206, 208, 210, 212, 214, 216 and/or the mathematical equations used to calculate one or more of the scores 202, 204, 206, 208, 210, 212, 214, 216.

Changing the weights and/or equations can change one or more of the synaptic circuits 614 to modified synaptic circuits 614'. These modified circuits 614' can connect different neurons 606 with each other such that the same input 616 would result in different neurons 606 receiving input and passing output to other neurons 606, and generating a different output 618' (e.g., a different impact score 218) from the ANN 600.

During a subsequent iteration of operation of the ANN 600, additional labeled training data can be provided to the neurons 606 as the input 616 into the input layer 604A, and the neurons 606 can process the input data again to generate an output 618' (e.g., an impact score 218) from the ANN 600. The output 618' is again examined for error in which labels are applied, and can be provided back to the ANN 600 to continue modifying and refining (e.g., training or retraining) the relationships between the neurons 606 (e.g., the synaptic circuits 614) and/or the weights applied by the neurons 606 to decrease the error of outputs from the ANN 600. For example, the ANN 600 may be trained and retrained using backpropagation, which can involve adjusting model parameters (e.g., synaptic circuits 614 and/or weights) using calculated derivatives to minimize the loss function (e.g., the error in calculating the impact scores 218). The backpropagation can be a mathematical calculation for supervised learning of the ANN 600 using gradient descent. Backpropagation can be used to calculate the gradient of the error function with respect to the weights of the ANN 600.

Figure 7:
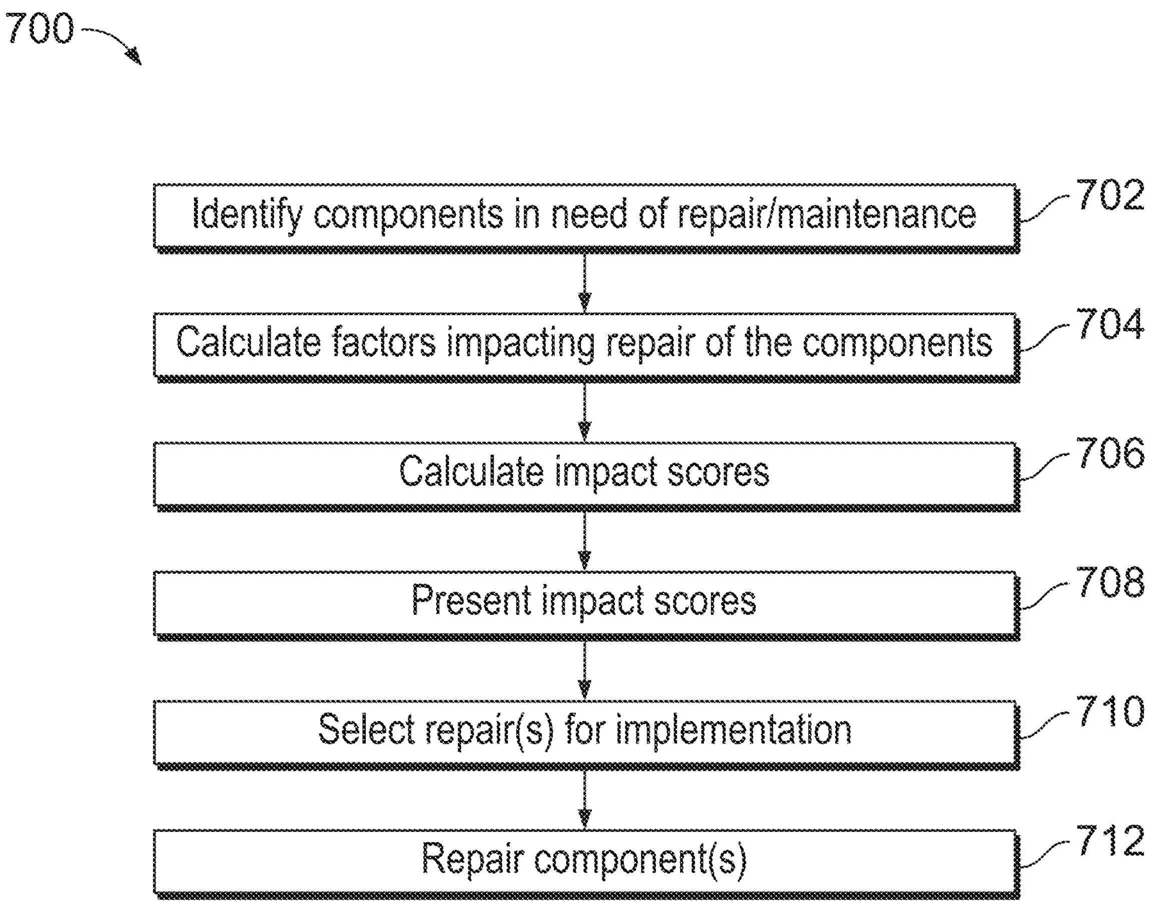
FIG. 7 illustrates a flowchart of one example of a method for identifying impacts of repairs of different components and implementing at least one of the repairs.

FIG. 7 illustrates a flowchart of one example of a method 700 for identifying impacts of repairs of different components and implementing at least one of the repairs. The method 700 can represent one or more operations of the maintenance system 100 described herein. At 702, components of a powered system (e.g., an aircraft) in need of repair or maintenance are identified. These components may be identified by maintenance personnel, by sensors identifying out-of-range characteristics of the components or the output from the components, or the like. At 704, different factors related to the impact of the components being repaired are calculated. For example, the scores 202, 204, 206, 208, 210, 212, 214, and/or 216 may be calculated for each of the components in need of repair or maintenance.

At 706, impact scores are calculated for the components. As described above, the impact scores can be aggregates of the scores 202, 204, 206, 208, 210, 212, 214, and/or 216, such as a sum, average, or median. At 708, the impact scores of the different components are presented to maintenance personnel. For example, differently sized and/or colored icons may be presented on the display device 106 to indicate the relative impact of different repairs on the different components. At 710, at least one of the repairs are selected for implementation. For example, the control unit 102 can automatically select the repair having the greatest impact score, or may select several of the repairs associated with lesser impact scores, to perform. The repair with the greatest impact score may be selected to get the most difficult and time-consuming repair finished sooner where there is sufficient time and resources available. The repairs with lesser impact scores may be selected to get more less time-consuming repairs finished sooner. At 712, the selected repair(s) are implemented. For example, the component(s) associated with the selected repair(s) may be replaced or repaired. Flow of the method 700 may repeat one or more additional times to complete additional repairs.

Figure 8:
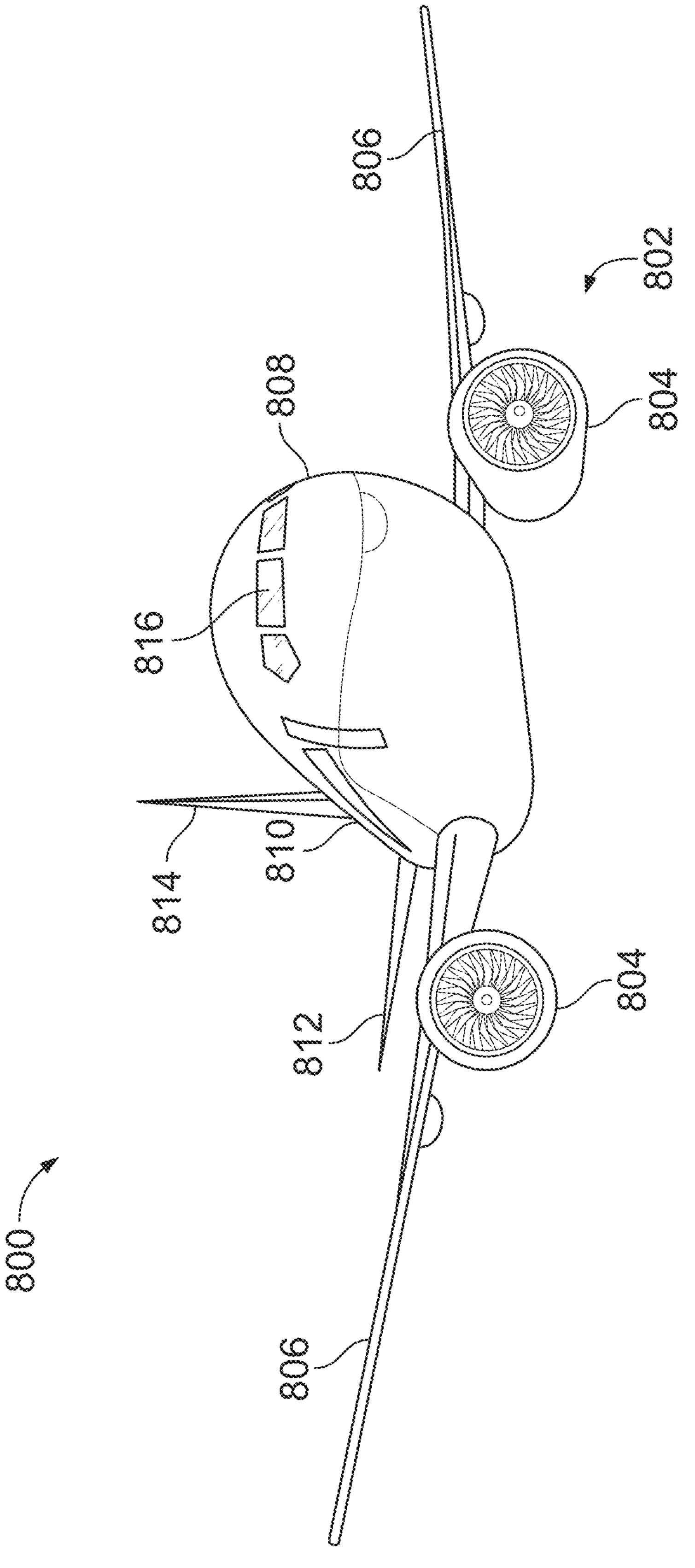
FIG. 8 illustrates a perspective front view of one example of a powered system.

FIG. 8 illustrates a perspective front view of one example of a powered system 800. The powered system 800 can be an aircraft or another system, as described above. The powered system 800 includes components such as a propulsion system 802 that includes components such as engines 804, for example. Optionally, the propulsion system 802 may include more engines 804 than shown. The engines 804 are carried by wings 806 of the aircraft 800. In other examples, the engines 804 may be carried by a fuselage 808 and/or an empennage 810. The empennage 810 may also support horizontal stabilizers 812 and a vertical stabilizer 814. The fuselage 808 of the aircraft 800 defines an internal cabin 816, which includes a flight deck or cockpit, one or more work sections (for example, galleys, personnel carry-on baggage areas, and the like), one or more passenger sections (for example, first class, business class, and coach sections), one or more lavatories, and/or the like. The aircraft 400 can be sized, shaped, and configured differently than shown in FIG. 8. The pilot or other operators described herein may be onboard the aircraft or may be off-board the aircraft and remotely monitoring and/or controlling the aircraft.

Further, the disclosure comprises examples according to the following clauses:

Clause 1: A method comprising:

identifying components of a vehicle in need of repair;

calculating several category scores representative of one or more of difficulty or time needed to perform several repairs of the components;

aggregating the category scores for each of the components into an impact score; and presenting icons representative of the impact scores for the components, the icons presented with one or more of sizes or shapes indicative of the impact scores.

Clause 2: The method of Clause 1, wherein the category scores that are calculated include flight deck effect occurrence rate scores indicative of occurrence rates at which the repairs are needed.

Clause 3: The method of Clause 1, wherein the category scores that are calculated include scheduled interval occurrence rate scores indicative of occurrence rates at which the components have faults leading to requiring the repairs.

Clause 4: The method of Clause 1, wherein the category scores that are calculated include component removal scores indicative of difficulties in removing the components in need of the repairs.

Clause 5: The method of Clause 1, wherein the category scores that are calculated include repair difficulty scores indicative of difficulties involved in performing the repairs.

Clause 6: The method of Clause 1, wherein the category scores that are calculated include vehicle down time scores indicative of down time durations of the vehicle during the repairs.

Clause 7: The method of Clause 1, wherein the category scores that are calculated include special requirement scores indicative of specialized needs to complete the repairs.

Clause 8: The method of Clause 1, wherein the category scores that are calculated include in-the-way removal scores indicative of additional components that are to be removed to complete the repairs.

Clause 9: The method of Clause 1, wherein the category scores that are calculated include minimum equipment list scores indicative of abilities to defer the repairs and abilities of the vehicle to fly with the repairs being deferred.

Clause 10: The method of Clause 1, wherein identifying the components, calculating the category scores, aggregating the category scores, and presenting the icons are performed by an application-specific integrated circuit (ASIC) for an artificial neural network, wherein the ASIC comprises:

- a plurality of neurons organized in an array, wherein each of the neurons comprises a register, a processor, and at least one input, and
- a plurality of synaptic circuits, each of the synaptic circuits including a memory for storing a synaptic weight, wherein each of the neurons is connected to at least one other of the neurons via one of the synaptic circuits.

Clause 11: A maintenance system comprising:

- a control unit configured to identify components of a vehicle in need of repair, calculate several category scores representative of one or more of difficulty or time needed to perform several repairs of the components, and aggregate the category scores for each of the components into an impact score; and
- a display device configured to present icons representative of the impact scores for the components, the icons presented with one or more of sizes or shapes indicative of the impact scores.

Clause 12: The maintenance system of Clause 11, wherein the control unit is configured to calculate flight deck effect occurrence rate scores indicative of occurrence rates at which the repairs are needed as the category scores.

Clause 13: The maintenance system of Clause 11, wherein the control unit is configured to calculate the category scores to include scheduled interval occurrence rate scores indicative of occurrence rates at which the components have faults leading to requiring the repairs.

Clause 14: The maintenance system of Clause 11, wherein the control unit is configured to calculate the category scores to include component removal scores indicative of difficulties in removing the components in need of the repairs.

Clause 15: The maintenance system of Clause 11, wherein the control unit is configured to calculate the category scores to include repair difficulty scores indicative of difficulties involved in performing the repairs.

Clause 16: The maintenance system of Clause 11, wherein the control unit is configured to calculate the category scores to include vehicle down time scores indicative of down time durations of the vehicle during the repairs.

Clause 17: The maintenance system of Clause 11, wherein the control unit is configured to calculate the category scores to include special requirement scores indicative of specialized needs to complete the repairs.

Clause 18: The maintenance system of Clause 11, wherein the control unit is configured to calculate the category scores to include one or both of (a) in-the-way removal scores indicative of additional components that are to be removed to complete the repairs, or (b) minimum equipment list scores indicative of abilities to defer the repairs and abilities of the vehicle to fly with the repairs being deferred.

Clause 19: The maintenance system of Clause 11, wherein the control unit includes an application-specific integrated circuit (ASIC) for an artificial neural network, wherein the ASIC comprises:

- a plurality of neurons organized in an array, wherein each of the neurons comprises a register, a processor, and at least one input, and
- a plurality of synaptic circuits, each of the synaptic circuits including a memory for storing a synaptic weight, wherein each of the neurons is connected to at least one other of the neurons via one of the synaptic circuits.

Clause 20: A maintenance system comprising:

- a control unit configured to identify components of a vehicle in need of repair, calculate several category scores representative of one or more of difficulty or time needed to perform several repairs of the components, and aggregate the category scores for each of the components into an impact score, the category scores including flight deck effect occurrence rate scores indicative of first occurrence rates at which the repairs are needed as the category scores, scheduled interval occurrence rate scores indicative of second occurrence rates at which the components have faults leading to requiring the repairs, component removal scores indicative of difficulties in removing the components in need of the repairs, repair difficulty scores indicative of difficulties involved in performing the repairs, vehicle down time scores indicative of down time durations of the vehicle during the repairs, special requirement scores indicative of specialized needs to complete the repairs, in-the-way removal scores indicative of additional components that are to be removed to complete the repairs, and minimum equipment list scores indicative of abilities to defer the repairs and abilities of the vehicle to fly with the repairs being deferred; and
- a display device configured to present icons representative of the impact scores for the components, the icons presented with one or more of sizes or shapes indicative of the impact scores.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

identifying components of a vehicle in need of repair using an application specific integrated circuit (ASIC) for an artificial neural network, wherein the ASIC includes a plurality of neurons organized in an array with each of the neurons including a register, a processor, and at least one input, the ASIC also including a plurality of synaptic circuits with each of the synaptic circuits including a memory for storing a synaptic weight and each of the neurons being connected to at least one other of the neurons via one of the synaptic circuits;

calculating, using the ASIC, several category scores representative of one or more of difficulty or time needed to perform several repairs of the components;

aggregating, using the ASIC, the category scores for each of the components into an impact score; and presenting, using the ASIC, icons representative of the impact scores for the components, the icons presented with one or more of sizes or shapes indicative of the impact scores.

2. The method of claim 1, wherein the category scores that are calculated include flight deck effect occurrence rate scores indicative of occurrence rates at which the repairs are needed.

3. The method of claim 1, wherein the category scores that are calculated include scheduled interval occurrence rate scores indicative of occurrence rates at which the components have faults leading to requiring the repairs.

4. The method of claim 1, wherein the category scores that are calculated include component removal scores indicative of difficulties in removing the components in need of the repairs.

5. The method of claim 1, wherein the category scores that are calculated include repair difficulty scores indicative of difficulties involved in performing the repairs.

6. The method of claim 1, wherein the category scores that are calculated include vehicle down time scores indicative of down time durations of the vehicle during the repairs.

7. The method of claim 1, wherein the category scores that are calculated include special requirement scores indicative of specialized needs to complete the repairs.

8. The method of claim 1, wherein the category scores that are calculated include in-the-way removal scores indicative of additional components that are to be removed to complete the repairs.

9. The method of claim 1, wherein the category scores that are calculated include minimum equipment list scores indicative of abilities to defer the repairs and abilities of the vehicle to fly with the repairs being deferred.

10. The method of claim 1, further comprising:

receiving, by the ASIC, data regarding detected faults that require maintenance from one or more issue monitoring systems of the vehicle and one or more sensors of the vehicle; and storing, by the ASIC, such information in an issues database in communication with the ASIC;

wherein the components of the vehicle in need of repair are identified based on the data regarding detected faults stored in the issues database;

wherein the several category scores are calculated by analyzing aggregated data stored in the issues database;

wherein presenting the icons includes operating, by the ASIC, a display to present the icons representative of the impact scores for the components, the display operated by the ASIC to arrange the icons in different zones to represent a status or state of repair or maintenance represented by the icons in the different zones, the different zones representing repairs that have not yet begun or been initiated, repairs that are in progress, and repairs that have been completed.

11. A maintenance system comprising:

an application specific integrated circuit (ASIC) for an artificial neural network, the ASIC including:

a plurality of neurons organized in an array with each of the neurons including a register, a processor, and at least one input; and a plurality of synaptic circuits with each of the synaptic circuits including a memory for storing a synaptic weight and each of the neurons being connected to at least one other of the neurons via one of the synaptic circuits, wherein the ASIC is configured to identify components of a vehicle in need of repair, calculate several category scores representative of one or more of difficulty or time needed to perform several repairs of the components, and aggregate the category scores for each of the components into an impact score; and a display device configured to present icons representative of the impact scores for the components, the icons presented with one or more of sizes or shapes indicative of the impact scores.

12. The maintenance system of claim 11, wherein the ASIC is configured to calculate flight deck effect occurrence rate scores indicative of occurrence rates at which the repairs are needed as the category scores.

13. The maintenance system of claim 11, wherein the ASIC is configured to calculate the category scores to include scheduled interval occurrence rate scores indicative of occurrence rates at which the components have faults leading to requiring the repairs.

14. The maintenance system of claim 11, wherein the ASIC is configured to calculate the category scores to include component removal scores indicative of difficulties in removing the components in need of the repairs.

15. The maintenance system of claim 11, wherein the ASIC is configured to calculate the category scores to include repair difficulty scores indicative of difficulties involved in performing the repairs.

16. The maintenance system of claim 11, wherein the ASIC is configured to calculate the category scores to include vehicle down time scores indicative of down time durations of the vehicle during the repairs.

17. The maintenance system of claim 11, wherein the ASIC is configured to calculate the category scores to include special requirement scores indicative of specialized needs to complete the repairs.

18. The maintenance system of claim 11, wherein the ASIC is configured to calculate the category scores to include one or both of (a) in-the-way removal scores indicative of additional components that are to be removed to complete the repairs, or (b) minimum equipment list scores indicative of abilities to defer the repairs and abilities of the vehicle to fly with the repairs being deferred.

19. The maintenance system of claim 11, further comprising:

one or more issue monitoring systems of the vehicle, the one or more issue monitoring systems configured to output data regarding detected faults;

one or more sensors of the vehicle, the one or more sensors configured to output data regarding detected faults; and an issues database in communication with the ASIC;

wherein the ASIC is in communication with the one or more issue monitoring systems of the vehicle, the one or more sensors of the vehicle, and the issues database, the ASIC configured to receive data regarding detected faults from the one or more issue monitoring systems of the vehicle and the one or more sensors of the vehicle and store such information in the issues database to identify the components in need of repair, calculate the several category scores, and aggregate the category scores;

wherein the display device is configured to arrange the icons in different zones to represent a status or state of repair or maintenance represented by the icons in the different zones, the different zones representing repairs that have not yet begun or been initiated, repairs that are in progress, and repairs that have been completed.

20. A maintenance system comprising:

an application specific integrated circuit (ASIC) for an artificial neural network, the ASIC including:

a plurality of neurons organized in an array with each of the neurons including a register, a processor, and at least one input; and a plurality of synaptic circuits with each of the synaptic circuits including a memory for storing a synaptic weight and each of the neurons being connected to at least one other of the neurons via one of the synaptic circuits, wherein the ASIC is configured to identify components of a vehicle in need of repair, calculate several category scores representative of one or more of difficulty or time needed to perform several repairs of the components, and aggregate the category scores for each of the components into an impact score, the category scores including flight deck effect occurrence rate scores indicative of first occurrence rates at which the repairs are needed as the category scores, scheduled interval occurrence rate scores indicative of second occurrence rates at which the components have faults leading to requiring the repairs, component removal scores indicative of difficulties in removing the components in need of the repairs, repair difficulty scores indicative of difficulties involved in performing the repairs, vehicle down time scores indicative of down time durations of the vehicle during the repairs, special requirement scores indicative of specialized needs to complete the repairs, in-the-way removal scores indicative of additional components that are to be removed to complete the repairs, and minimum equipment list scores indicative of abilities to defer the repairs and abilities of the vehicle to fly with the repairs being deferred; and a display device configured to present icons representative of the impact scores for the components, the icons presented with one or more of sizes or shapes indicative of the impact scores.

* * * * *